(12) United States Patent
Hennecke

(10) Patent No.: US 6,279,312 B1
(45) Date of Patent: Aug. 28, 2001

(54) GAS TURBINE WITH SOLAR HEATED STEAM INJECTION SYSTEM

(75) Inventor: Klaus Hennecke, Lohmar (DE)

(73) Assignee: Deutsches Zentrum fuer Luft- und Raumfahrt e.V., Bonn (DE)

( * ) Notice: Subject to any disclaimer, the term of this patent is extended or adjusted under 35 U.S.C. 154(b) by 0 days.

(21) Appl. No.: 09/424,768
(22) PCT Filed: May 29, 1998
(86) PCT No.: PCT/EP98/03235
  § 371 Date: Nov. 30, 1999
  § 102(e) Date: Nov. 30, 1999
(87) PCT Pub. No.: WO98/55740
  PCT Pub. Date: Dec. 10, 1998

(30) Foreign Application Priority Data

Jun. 5, 1997 (DE) .............................................. 197 23 543

(51) Int. Cl.⁷ ...................................................... F02C 3/30
(52) U.S. Cl. .............................................. 60/39.3; 60/39.55
(58) Field of Search ................................. 60/39.07, 39.182, 60/39.3, 39.55

(56) References Cited

U.S. PATENT DOCUMENTS

5,444,972 * 8/1995 Moore ................................ 60/39.182
5,566,542 * 10/1996 Chen et al. .......................... 60/39.55
5,623,822 * 4/1997 Schuetzendueble et al. ..... 60/39.182

FOREIGN PATENT DOCUMENTS

195 38 670 * 4/1997 (DE) .

* cited by examiner

Primary Examiner—Louis J. Casaregola
(74) Attorney, Agent, or Firm—Diller, Ramik & Wight

(57) ABSTRACT

The energy generating installation comprises a gas turbine (10) which is operated by steam injected via a steam line (16). The outlet (18) of the gas turbine (10) is connected with the heat exchanger (21) of a waste heat boiler (19). The waste heat boiler (19) contains a steam drum (22) connected to a preheater (24) and a steam generator (23) of the heat exchanger (21). According to the invention a solar steam generator (36) is connected to the steam drum (22) in a second circuit (39). The steam produced by the solar steam generator (36) is heated in a superheater (22) and then used for steam injection purposes. The energy generating installation offers high flexibility at high efficiency despite the unreliable availability of solar energy.

8 Claims, 1 Drawing Sheet

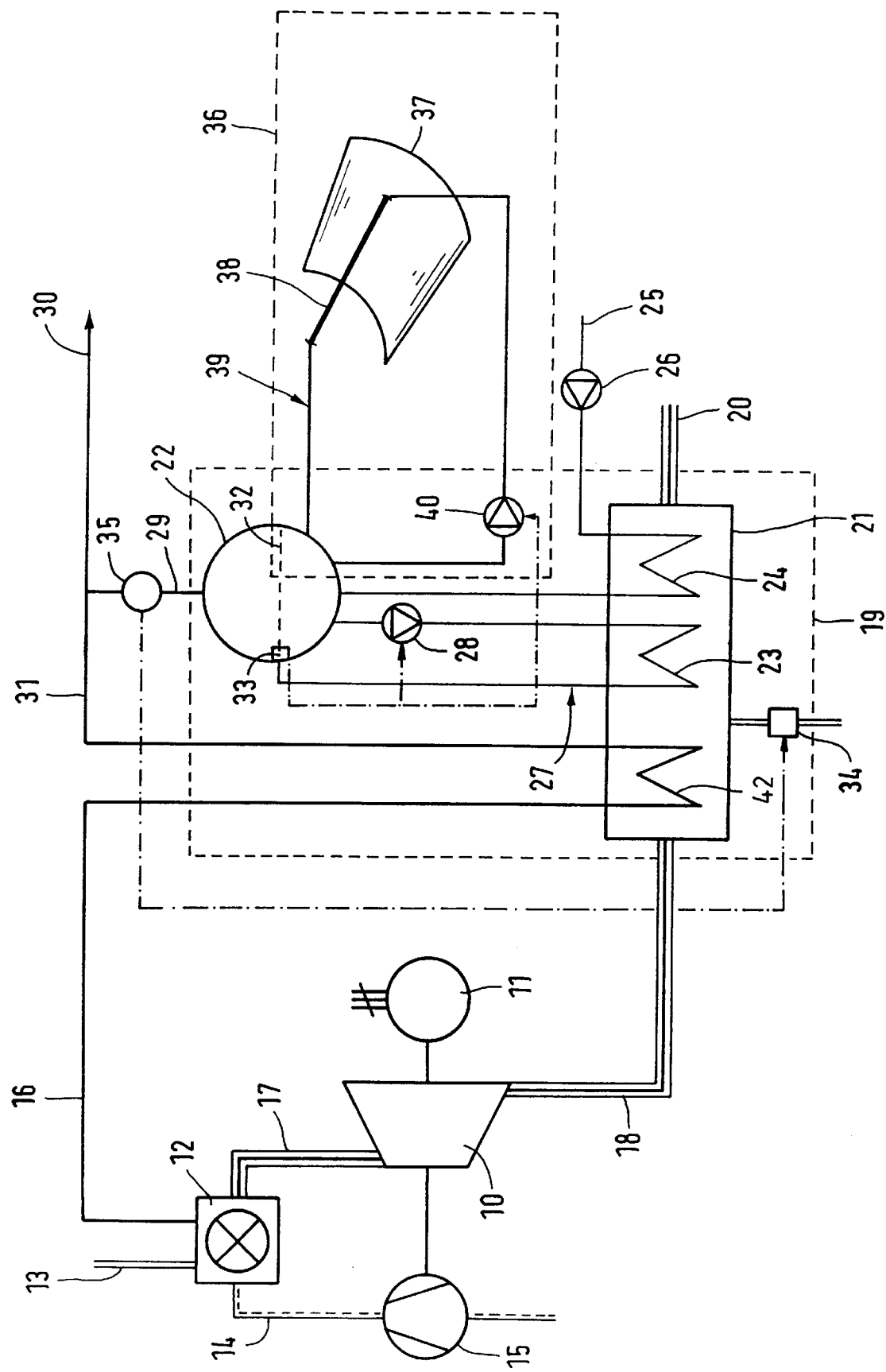

GAS TURBINE WITH SOLAR HEATED STEAM INJECTION SYSTEM

BACKGROUND OF THE INVENTION

The invention relates to an energy generating installation comprising a gas turbine operated by steam injection, with a waste heat boiler being provided for steam production, which additionally supplies process steam to an external consumer.

Energy generating installations are known in the art, with a gas turbine being operated by additional steam injection, wherein the steam production takes place in a waste heat boiler heated by the exhaust gases of the steam turbine and a back-up firing equipment may be provided. This principle is consistently realized in the Cheng cycle where the overall steam flow can be fed into the gas turbine without a back-up firing equipment being required. Such an energy generating installation is described in the catalog "Cheng Cycle Series 7, Kraft-Wärme-Kopplung mit Gas Turbinen" [Cheng Cycle Series 7, Combined heat and power generation using gas turbines] of ELIN Energieversorgung Gesellschaft mbH. As compared with steam turbine installations, the Cheng cycle is characterized by lower investment costs involved, since moderate pressures and temperates prevail in the waste heat boiler and a condenser is not required.

Further, solar steam generators are known in the art, which use solar energy for steam generating purposes. Typical installations are parabolic trough collectors where paraboloidal type reflectors focus the solar energy onto a pipe carrying a heat transfer medium. One problem encountered when using solar steam generators is the unreliable availability of solar energy. It is therefore necessary that an additional fuel-firing equipment is provided. Due to the steam conditions achievable with solar energy, the fuel fired by such a back-up equipment can only be utilized with lower energy efficiency.

In the case of hybrid installations negative interactions between solar and conventional installation sections are normally inevitable (e. g. reduced efficiency when fossil fuel is fired, restricted operating range of the solar field). Solar steam injection into a gas turbine is not attractive for pure power generation since the steam flow which can be produced in the waste heat boiler satisfies or even exceeds the maximum operating flow of the turbine. The necessity of using a 100% fossil fuel-firing back-up equipment hitherto resulted in a solar installation which had not been optimally incoporated in an overall system designed for this purpose but "placed upon" a conventional installation. The additionally generated solar heat can be utilized in such systems only to a limited extent. This reduces the utilization ratio of the solar installation and the realizable fuel saving.

SUMMARY OF THE INVENTION

It is the object of the present invention to provide an energy generating installation which is supplied with both fossil energy and solar energy and is capable of responding to the quantity of solar energy offered in order to be in a position to operate a gas turbine at high efficiency.

The energy generating installation of the invention generally operates according to the Cheng cycle principle offering all advantages achievable in this way. In addition to the evaporator which, together with the steam drum, forms a first circuit, a second circuit is connected to the steam drum said second circuit containing a solar steam generator. Here the moderate pressure and temperature conditions occurring in the first circuit of the Cheng cycle are utilized to directly couple a solar steam generator. The steam generated by the solar field is heated in the superheater of the heat exchanger and can be utilized as saturated steam in the gas turbine operated by steam injection either to increase the power generation or reduce the fuel consumption. Steam injection into the gas turbine requires only moderate pressures (approximately 20 bar). The resultant low saturation temperatures have a positive effect on the efficiency of the solar energy generator.

Special advantages are offered with regard to direct evaporation. The saturated steam production in the recirculation process allows stable operation of the solar steam generator without high demands being made on the control means even if the amount of solar radiation available is subject to variations. The solar steam generator may be configured as a parabolic trough collector in which the circulating water is directly evaporated. On the other hand it is also possible to heat a heat carrying medium, e. g. oil, with solar energy and transfer the heat energy absorbed via a heat exchanger to water. The temperature of the steam supplied by the solar steam generator should amount to approximately 200° C.

In the following an embodiment of the invention is explained in detail with reference to the single drawing.

DETAILED DESCRIPTION OF THE DRAWINGS

The drawing shows a schematic representation of the energy generating installation.

DESCRIPTION OF THE PREFERRED EMBODIMENTS

The energy generating installation comprises a gas turbine 10 operated by steam injection which drives a power generator 11. The inlet into the gas turbine is connected with a burner 12 to which via a fuel line 13 liquid or gaseous fuel is supplied and via an air line 14 compressed air is supplied which is produced by a compressor 15 driven by the gas turbine 10. Further a steam line 16 for injecting steam into the combustion chamber is led into the burner 12. The combustion gases produced in the burner 12 are mixed with the injected steam and supplied to the inlet 17 of the gas turbine 10.

The expanded exhaust gases of the gas turbine 10 are fed from the outlet 18 through a waste heat boiler 19 and then to an exhaust gas line 20 in which the water can be recovered by condensation.

The waste heat boiler 19 comprises a heat exchanger 21 and a steam drum 22. The exhaust gases from the steam turbine 10 flow into the heat exchanger 21 for heat dissipation purposes. This heat is supplied to three heat absorption units which are arranged in the heat exchanger 21 in the following order: a superheater 42, an evaporator 23 and a preheater 24. The exhaust gases have the highest temperature at the superheater 42 and the lowest temperature at the preheater 24 since they have already dissipated part of their heat.

The inlet of the preheater 24 is connected to a feedwater line 25 containing a feedwater pump 26 and its outlet is connected to the steam drum 22.

The evaporator 23 forms, together with the steam drum 22, a first circuit 27 in which a first pump 28 is incorporated. The inlet of the pump 28 is arranged near the head of the steam drum 22 so that the pump discharges water from the steam drum 22. The return line of the circuit 27 is led above the water level in the steam drum 22 into the steam drum.

In the upper section the steam drum 22 contains a steam outlet 29 which is connected on the one hand with a process steam outlet 30 and on the other hand with a steam line 31 leading to the superheater 42. From the steam line 31, the steam flows through the superheater 42 to the steam line 16 for steam injection purposes. The steam drum 22 comprises a vessel in which a water level 32 prevails. Above the water level 32, there is steam with a pressure of approximately 20 bar and a temperature of approximately 200° C. The water level 32 is detected by a level sensor 33 which controls the pump 28 in such a way that in the case of too high a level, the flow rate through the first circuit 27 is increased and in the case of too low a level, the flow rate is reduced.

The waste heat boiler 19 is provided with a burner 34 via which additional heat can be supplied to the heat exchanger 21. The burner 34 is controlled as a function of the signal provided by a flowmeter 35 arranged in the steam outlet 29. If the steam flow extracted from the steam drum 22 is large, the capacity of the burner 34 is increased. Further, the flowmeter 35 controls the feedwater pump 26. If too much steam is extracted from the steam drum 22, a correspondingly larger quantity of feedwater must be supplied.

According to the present invention, a solar steam generator 36 is connected to the steam drum 22, which, in this case, is a solar field 37 made up of trough collectors. The solar field 37 comprises trough-type reflectors which focus the sunlight onto a water-carrying absorber tube 38. The absorber tube 38 is connected to the steam drum 22 to form a second circuit 39 containing a circulating pump 40. The pump 40 is controlled as a function of the signal provided by the level sensor 33 in such a way that in the case of decreasing level 32 the pumping capacity is increased.

Instead of the solar field made up of directly evaporating collectors a solar steam generator with interconnected heat carrying oil circuit may be employed.

The back-up firing equipment with burner 34 is controlled in such a way that the sum of the steam mass flows measured for the process steam (at outlet 30) and the injection steam corresponds to the specified overall flow. The feedwater pump 26 is controlled in accordance with the respective instantaneous steam production.

Fluctuations in the solar radiation onto the solar steam generator 36 result in a variation of the steam production of the solar steam generator and thus in a variation of the water level 32 in the steam drum 22. This level variation serves as a signal for adjustment of the mass flows in the solar steam generator 36 or the waste heat boiler 19. In the case of decreasing liquid level, the capacity of the circulating pump 40 is increased and that of pump 28 reduced. At the same time the fuel supply to burner 34 is also reduced. In the case of rising water level 32, the reverse procedure takes place.

If in the case of strong solar radiation and low demand for process steam the steam production exceeds the demand, the power generation can be increased by steam injection up to the maximum capacity of the gas turbine 10. The excess power is then fed into the power supply mains. Alternatively, the fuel supply to the gas turbine may be reduced, with simultaneous steam injection, to such an extent that the auxiliary power and process steam requirement is just satisfied.

The steam injection into the gas turbine 10 requires only moderate pressures. The resultant low saturation temperatures have a positive effect on the efficiency of the solar field 37. The mechanical equipment can be realized in an installation of relatively small size. The saturated steam production in the recirculation process allows stable operation of the solar steam generator without high demands being made on the control means even in the case of fluctuating quantity of solar radiation.

Thanks to the flexibility of the gas turbine process with steam injection the steam produced by the solar process can be utilized at high efficiency. Nevertheless the efficiency of fossil fuel combustion is not affected by part-load operation.

Although a preferred embodiment of the invention has been specifically illustrated and described herein, it is to be understood that minor variations may be made in the apparatus without departing from the spirit and scope of the invention, as defined the appended claims.

What is claimed is:

1. An energy generating installation comprising:
    a gas turbine (10) for operating a power generator (11);
    a waste heat boiler (19) including a steam drum (22) and a heat exchanger (21) connected to an outlet (18) of the gas turbine (10);
    the heat exchanger (21) including:
        a superheater (42) for heating steam supplied from the steam drum (22) and for feeding the heated steam to the gas turbine (10) for steam injection purposes,
        an evaporator (23) and the steam drum (22) at least in part defining a first circuit (27), and
        a preheater (24) for heating feedwater and for feeding the heated feedwater to the steam drum (22); and
    a solar steam generator (36) being connected to the steam drum (22) and defining therewith a second circuit (39), the second circuit (39) including a pump (40), and a water level sensor (33) for controlling the pump (40) in inverse relationship to changes in water level (32) in the steam drum (22).

2. The energy generating installation according to claim 1 wherein the steam drum (22) is connected with a steam outlet (30) for supplying process steam externally of the energy generating installation.

3. The energy generating installation according to claim 1 wherein the first circuit (27) includes a pump (28), and said first circuit pump (28) is controlled by the water level sensor (33).

4. The energy generating installation according to claim 1 including a feed water pump (26) for pumping feedwater to the preheater (24) and thereby controlling the steam flow leaving the steam drum (22).

5. An energy generating installation comprising:
    a gas turbine (10) for operating a power generator (11);
    a waste heat boiler (19) including a steam drum (22), and a heat exchanger (21) connected to an outlet (18) of the gas turbine (10);
    the waste heat boiler (19) further including a burner (34) directly controlled by a flowmeter (35) responsive to steam flow leaving the steam drum (22);
    the heat exchanger (21) including:
        a superheater (42) for heating steam supplied from the steam drum (22) and for feeding the heated steam to the gas turbine (10) for steam injection purposes,
        an evaporator (23) and the steam drum (22) at least in part defining a first circuit (27), and
        a preheater (24) for heating feedwater and for feeding the heated feedwater to the steam drum (22); and
    a solar steam generator (36) being connected to the steam drum (22) and defining therewith a second circuit (39).

6. The energy generating installation according to claim 5 wherein the steam drum (22) is connected with a steam outlet (30) for supplying process steam externally of the energy generating installation.

7. The energy generating installation according to claim 5 wherein the first circuit (27) includes a pump (28), and said first circuit pump (28) is controlled by a water level sensor (33) for sensing water levels in the steam drum (22).

8. The energy generating installation according to claim 5 including a feed water pump (26) for pumping feedwater to the preheater (24) and thereby control the steam flow leaving the steam drum (22).

* * * * *